G. H. PALLADY.
BROOM CORN SEEDING, BOOTING, AND CLEANING MACHINE.
APPLICATION FILED NOV. 4, 1912.
1,149,281.
Patented Aug. 10, 1915.
3 SHEETS—SHEET 2.
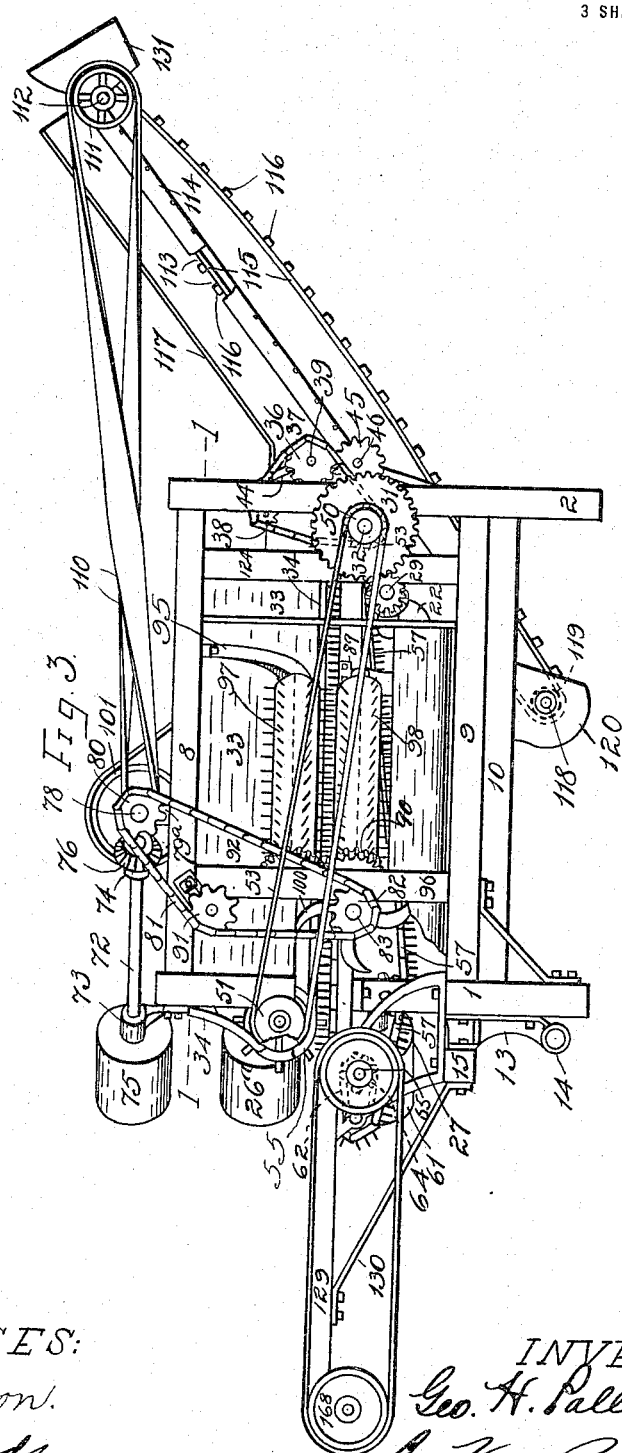
WITNESSES:
B. S. Lyon.
C. S. Richards.
INVENTOR:
Geo. H. Pallady,
By H. W. Richard
att.

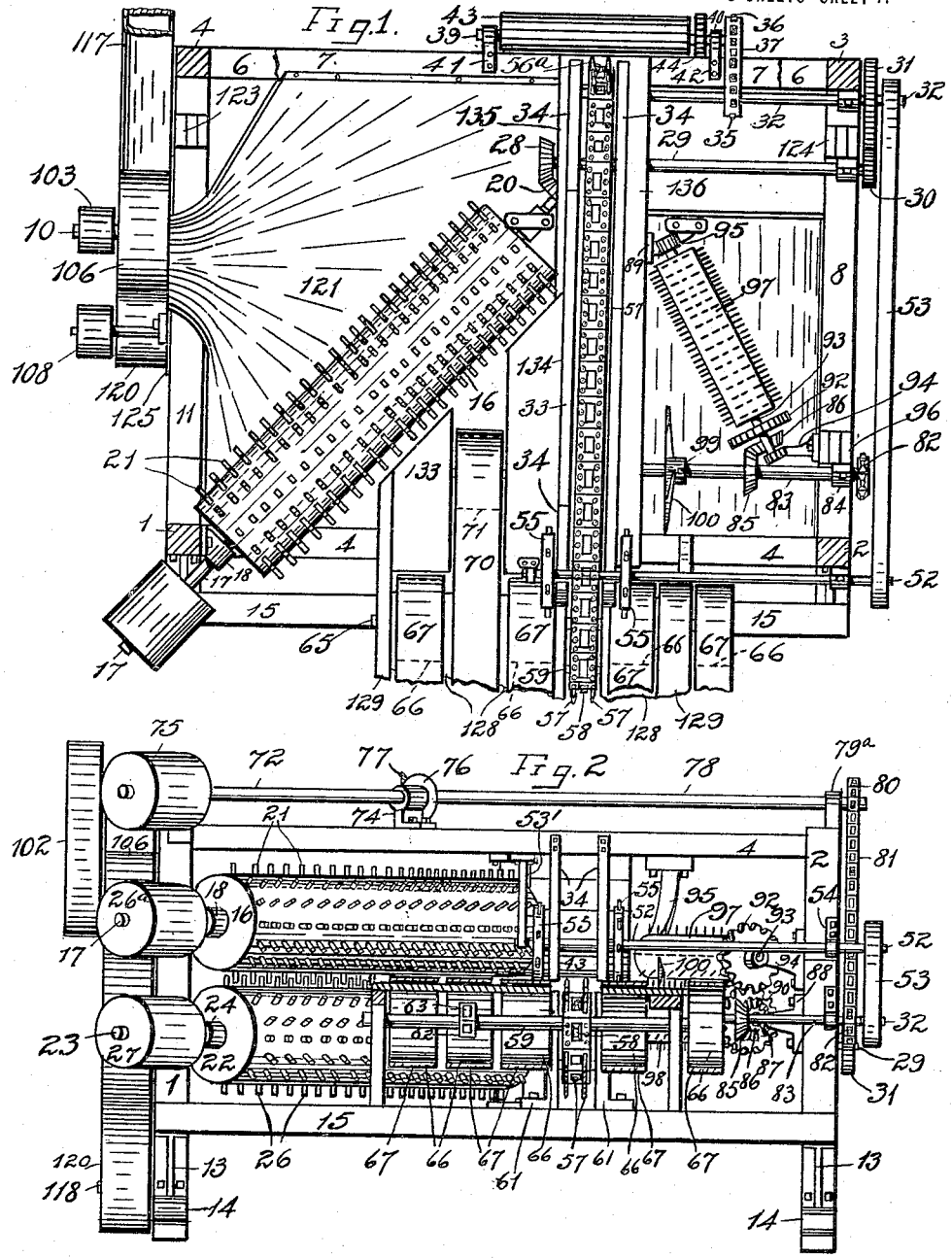

G. H. PALLADY.
BROOM CORN SEEDING, BOOTING, AND CLEANING MACHINE.
APPLICATION FILED NOV. 4, 1912.
1,149,281.
Patented Aug. 10, 1915.
3 SHEETS—SHEET 3.
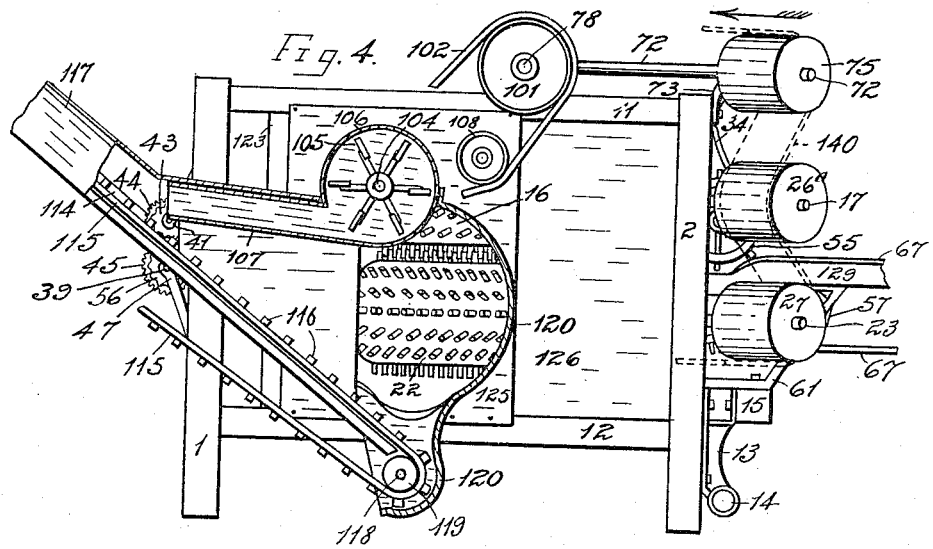
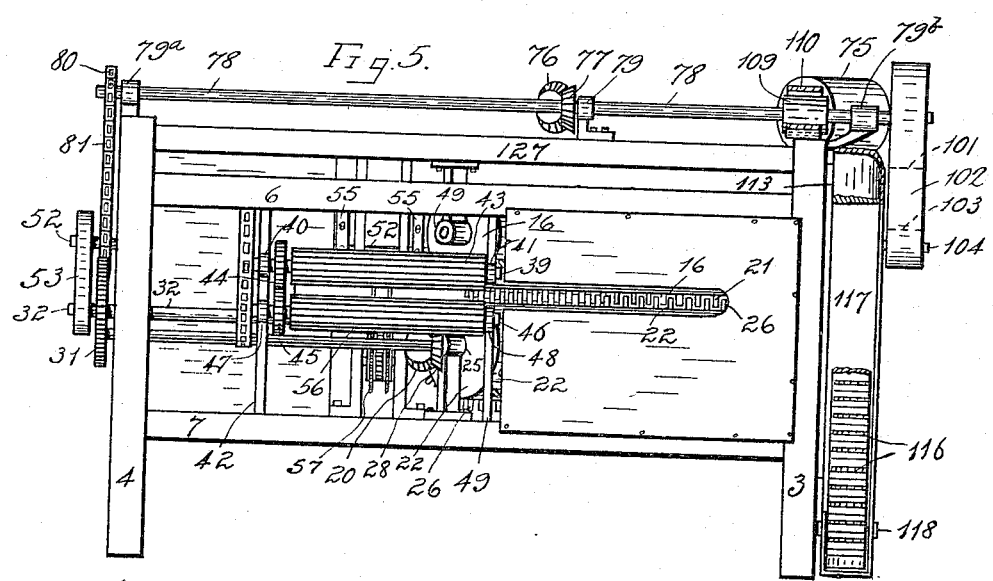
WITNESSES:
INVENTOR:

UNITED STATES PATENT OFFICE.

GEORGE H. PALLADY, OF ALLERTON, IOWA.

BROOM-CORN SEEDING, BOOTING, AND CLEANING MACHINE.

1,149,281.   Specification of Letters Patent.   Patented Aug. 10, 1915.

Application filed November 4, 1912. Serial No. 729,467.

*To all whom it may concern:*

Be it known that I, GEORGE H. PALLADY, a citizen of the United States, and a resident of Allerton, in the county of Wayne and State of Iowa, have invented a new and useful Broom-Corn Seeding, Booting, and Cleaning Machine, of which the following is a specification.

My invention relates to that class of machines which are employed to prepare broom-corn stalks for the market and which machines free the stalks from the seed on the heads thereof, remove the boots, leaves, dust, smut and lint, and otherwise act on the corn to render it salable.

The principal end and object of the invention is to generally improve the construction and increase the capacity, utility and efficiency of machines of this character. More specifically stated, however, the improvements are directed toward:—first: thoroughly and cleanly removing the seed from the brush, leaving it in such condition that no re-cleaning, or hand-cleaning, such as has heretofore been required, will be necessary; second: providing a stalk-recutting knife or sickle to sever the butts at predetermined and suitable lengths; third: providing means for loosening the boots and leaves from the lower portions of the stalks—an operation which has heretofore been manually accomplished at great expense; fourth: providing subsidiary boot and leaf loosening and removing means which act on the stalks after they have passed through and from the primary means for effecting this object, whereby said useless and objectionable portions may be easily shaken out; fifth: providing novel means for removing the dust, lint and smut, and, in connection therewith, to separate the seed therefrom and discharge it into a suitable receiver alongside the machine, the objectionable matter being sucked or blown from the machine and where it will not be inhaled by the operator; sixth: the provision of novel combinations of elements and devices for carrying out the above recited, as well as minor objects, part of which will be specifically pointed out and part is obvious.

For the purpose of illustrating my invention I have shown in the drawings forming part hereof that structure which is now preferred by me, since the same has been found in practice to give satisfactory results. However, it is to be understood that the several instrumentalities of which the invention consists may be variously constructed, arranged and organized, and that I do not contemplate the scope of my invention as limited to the structure, arrangement, or structural details shown and described, but consider it as covering all such changes as fairly fall within the general idea thereof, considered in its broadest aspect.

In said drawings, Figure 1 is a sectional view, taken in the plane of the line 1—1 in Fig. 3; Fig. 2, a front elevation, a few of the parts shown in section; Fig. 3, an elevation, seen from the right hand side; Fig. 4, an elevation, partly in section, seen from the left hand side; and Fig. 5, a rear elevation, a few of the parts in section.

Coming now to a detailed description of the drawings, 1, 2, 3 and 4 designate corner posts; 4 and 5, forward transverse frame bars; 6 and 7, like rear frame bars; 8, 9, right-hand side frame bars; and 10 and 11, left-hand side frame bars. These are suitably connected.

13, 13 are brackets having shaft bearings 14. 15 is a forward transverse supporting bar fixed on said brackets.

16 designates a combing or de-seeding cylinder fixed on a shaft 17 journaled in bearings 18, 19, the latter depending from the top of the machine. Said shaft is driven by a pulley 26$^a$. Said cylinder is provided with teeth 21, but in order that these may remove the seed in a more effective manner than has heretofore been done I have provided the rear portion or about one-half of the cylinder with additional—or a greater number of—teeth, which are set closer together than at the front portion. This arrangement is preferably carried out in the lower cylinder, 22, which is fixed on a shaft 23 mounted in bearings 24, 24 and is provided with teeth 26. A pulley 27 drives the shaft 23 in a direction contrary to that of the shaft 17, and on its inner end said shaft 23 carries and drives a bevel pinion 20 which meshes with and drives a like wheel 28 fixed on a shaft 29 on the outer end of which is fixed a pinion 30 which meshes with a spur wheel 31 secured on a shaft 32 seated in suitable bearings on the frame.

33 is a partition secured at its upper end or edge to the top (which, because it would obscure many of the parts if shown, has been omitted) and its lower edge to one of a pair of bearing-bars 34, the front ends of which are secured to the transverse bar 4.

35 is a sprocket wheel fixed on the shaft 32 and is geared to a like wheel 36 by means of a sprocket chain 37. 38 is an idler traversed by said chain. The wheel 36 is fixed on a shaft 39 journaled in bearings 40, 41. The bearing 40 is provided in a bearing-standard 42 (see Fig. 5) extending between the bars 6 and 7. A corrugated leaf and butt-loosening roller 43 is fixed on said shaft 39, as is also a spur 44 which gears with and drives a like spur 45 fixed on a shaft 46 journaled in a bearing 47 in the bar 42 and in a bearing 48 provided by a bearing standard 49 extending from the bar 7.

56 is a corrugated roller fixed on the shaft 46, and it, together with the roller 43, constitute finishing rollers for loosening and cutting off any portion of the boots and leaves which might have adhered to the main stalks after their primary treatments or operation, which will be presently described, and especially those boots which grow to the mid-portion of the stalk, it being that portion which is engaged by the feed-chain and which passes between the de-seeding and the booting cylinders, considered as pairs.

50 indicates a pulley fixed on the shaft 32 and by a belt 53 drives a similar pulley 51 fixed on a shaft 52 journaled in bearings 53′, 54, Fig. 2. Fixed on said shaft are toothed feed-wheels 55.

56ª designates a sprocket wheel fixed on the inner end of the shaft 32 and is embraced by and drives the rear flight of a toothed feed-chain 57, the forward portion of which embraces a similar wheel 58 fixed on a shaft 59 journaled in bearings 60 in supporting brackets 61 fixed on the bars 4 and 15. A chain 62 embraces a sprocket wheel 63 fixed on said shaft 59 and drives a similar wheel 64 fixed on a shaft 65 mounted in bearings in the brackets 61. Said shaft 65 drives pulleys 66 which are fixed thereon, and they in turn drive belts 67 which impart movement to follower pulleys 68 fixed thereon, and impart like movement to a pulley 69 which by a longer feed belt 70 drives a pulley 71.

72 indicates a diagonally arranged shaft mounted in bearings 73, 74 on the frame, and is driven by a pulley 75 on its outer end. On the inner end of said shaft is fixed a bevel pinion 76 which drives a like one 77 fixed on a transversely arranged shaft 78 mounted in bearings 79, 79ª, 79ᵇ. On the outer end of said shaft 78 is fixed a sprocket wheel 80 which drives a chain 81 which actuates a sprocket 82 fixed on a shaft 83 mounted in bearings 84, the inner one of which is obscured from view. 91 is an idler sprocket. A bevel pinion 85 is fixed on said shaft 83 and meshes with and drives a like one 86 fixed on a diagonally arranged shaft 87 mounted in bearings 88, 89. A spur wheel 90 is fixed on said shaft 87 and meshes with a like one 92 fixed on a shaft 93 journaled in bearings 94, 95, the former fixed to a standard 96 and the latter to the top. Boot and leaf loosening and stripping cylinders 97, 98 are fixed on the shafts 87 and 93. It is so evident that their teeth might be omitted, if desired, that I have not deemed it necessary to encumber the drawings with an illustration of toothless rollers. For convenience and in order to distinguish them they shall hereinafter be termed booting cylinders.

Secured on the shaft 83 by a set-screw 99 is a rotary stalk-cutting knife 100, which may be adjusted to and locked in any desired position thereon in order that the stalks or butts may be severed at predetermined lengths.

On the outer end of the shaft 78 is fixed a pulley 101 which drives a belt 102 embracing a pulley 103 fixed on a shaft 104 on which is secured a fan 105 working in a housing 106 communicating with an air-spout 107. Said belt traverses also an idler 108.

Fixed on the shaft 78 is a pulley 109 which drives a belt 110 which actuates a pulley 111 fixed on a shaft 112 mounted in bearings in the rear or upper end of an elevator spout 117 one side of which is open as shown at 113, Fig. 3, to permit the dust, lint, chaff and smut to be blown out thereof by the fan 105. A narrow strip 114 is secured along the lower edge of the spout 117 in order that the seed may be retained therein. These are carried on a belt 115 having transversely arranged slats 116, which belt is driven by a pulley on the shaft 112 and traverses also a pulley 119 mounted on a shaft 118 seated in suitable bearings in the lower portion of a housing 120 which communicates with a large inclined pan 121 which constitutes a floor for the left hand side portion of the machine and onto which the seed and the objectionable matter removed by the cylinders 16 and 22 fall.

123 and 124 are frame-standards.

125 is a plate fixed on the side of the frame and constitutes both a support for the housings and a side wall for a portion of the machine.

126 is another plate, which completes the side wall or inclosing shield.

127 is a rear transverse frame-bar.

128 is a feed-belt table supported between extension bars 129 which are in turn supported by braces 130.

131 is a tilting discharge spout for the seed.

133, 134 are guide or floor boards on which the brush or head of the stalk moves, and 135, 136 are guides for the butts.

The manner of operation will now be described. Assume stalks of broom-corn to be placed on the belts 67. The pulley 27 will impart motion to the shaft 23, thence to the bevel gears 20, 28 to rotate the shaft 29 to thus impart like movement to the pinion 30, which will actuate the spur 31 in the contrary direction to impart its movement to the shaft 32 and drive the procket 56ª and chain 57 and thereby the sprocket 58 and shaft 59, and the latter will impart like movement to the sprocket 63, chain 62, wheel 64 and shaft 65 which imparts movement to the pulleys 66 and thereby to the feed belts 67, 70 which will carry the stalks forwardly to the toothed feed-chain 57 which moves it onward to the feed-wheels 55 which force it into and hold it in engagement with said chain in the usual manner thereof. At this time the corn is passing over the floor 135, 136 and is held down by the guides 34. The sickle 100 having been adjusted on the shaft 83 by means of the set-screw 99 to cut the butts at a predetermined place, whereby the useful portions will be of practically uniform lengths, will be operated as follows: Movement being imparted to the pulley 75 by the belt 140 is imparted to the shaft 72 through the bevel gear 76, 77 to the shaft 78 and thence to sprocket 80, chain 81, sprocket 82 and shaft 83 to impart rotary movement to said knife or sickle. The butts of the stalks which project at the right of the guides 34 will be caught by the booting cylinders 97 and 98 and the boots and leaves thereof will be stripped off thereby. It will be manifest that the diagonal placement of said cylinders provides for the cleaning of either long or short butts, depending upon the placement or adjustment of the sickle. Said cylinders are actuated as follows: Said shaft 83 imparts movement to the bevel gear 85, 86 which rotates the shaft 87 which carries the spur 90 which meshes with the spur 92 which drives the shaft 93, whereby said cylinders are driven in contrary directions.

The cylinders 16 and 22 are fed as hereinabove described and are actuated as follows: The belt 140 moves over both pulleys 26 and 27, but on opposite sides thereof, as shown, to drive them and thereby the cylinders 16 and 22 in opposite directions. As the brushes or heads of the corn reach the front group or order of teeth thereon—these being the more widely spaced ones—the seed will be scraped or stripped off therefrom in the ordinary manner and with the usual degree of efficiency. It is quite probable, however, that some of the seed will escape removal, but these will be caught and scraped off by the closer-set teeth at the rear ends of the cylinders, whereby the heretofore expensive necessity of manual re-cleaning is obviated. As the corn is carried onward the stalks will pass through the corrugated rollers 43 and 46, and these will crush and cut off the few leaves and boots which remain attached after the stalks have been acted on by the two sets of cylinders. These rollers are actuated as follows: The shaft 32 drives the sprocket 35, chain 37, sprocket 36 and shaft 39 to rotate the spur 44 which will impart its motion to the roller 43, and simultaneously said spur will impart contrary movement to the spur 45 and thereby to the roller 46. The seed and other matter knocked and torn off by the cylinders 16 and 22 will fall onto the inclined pan 121, and the agitation of the running machine will cause it to gravitate thereover and fall upon the belt 115 and be carried upward by the slats 116. Said belt is actuated as follows: The shaft 78 being in operation as earlier herein described, it will drive the pulley 109, belt 110, pulley 111 and shaft 112 and thereby said belt 115. The shaft 78 imparts movement to the pulley 101, thence to belt 102 which drives pulley 103 to impart rotary movement to shaft 104 and thereby to the fan 105, whereby a current of air is forced through the spout 107, and, as said spout communicates with the spout 117, it will act on the ascending chaff, smut, lint and other light substances, which will be blown out thereby through the open side 113 of the last recited spout, while the seed, because of their weight, will not be blown out, but will be carried upward in an evident manner and dumped into the discharge spout 113, said seed being prevented by the strip 114 from falling out of said open side.

The main driving belt 140, a fragment of which is shown, derives motion from any suitable source and transmits it to the driving pulleys in the direction indicated by the arrow.

Having thus set forth the nature of my invention, and having stated its objects, purposes and advantages, I claim as new and desire to secure by Letters Patent the following, namely:

1. In a broom-corn machine of the class described, co-acting seed-stripping cylinders, co-acting cylinders for removing the boots from the butts of the broom-corn stalks, and co-acting corrugated finishing rollers for removing the boots from the midlength portion of the stalks.

2. In a broom-corn machine of the class described, co-acting seed-stripping cylinders, coacting finishing rollers for removing the boots from the midlength portions of the stalks, and means for removing the boots from the butts.

3. In a broom-corn machine of the class described, co-acting seed-stripping cylinders, means for removing the boots from the butts, and co-acting finishing rollers for removing the boots from the midlength portions of the stalks, means for feeding the corn to both of the recited mechanisms.

4. Combined in a broom-corn machine of the class described, means for stripping the seed from the heads, means for cutting off the butts, co-acting finishing rollers for removing the boots from the midlength portions of the stalks, and means for removing the boots from the end portions of the remaining stalks.

5. Combined in a broom-corn machine of the class described, means for stripping the seed from the heads, means for removing the boots from the end portions of the stalks, and corrugated means for loosening and cleaning the boots from the midlength portions of the stalks.

6. Combined in a broom-corn machine of the class described, means for stripping the seed from the heads, means for severing the butt ends of the stalks, means for removing the boots from the unsevered end portions of the stalks, and means for loosening the boots from the midlength portions of the stalks.

7. Combined in a broom-corn machine of the class described, means for stripping the seed from the heads, means for removing the boots from the end portions of the stalks, and means for loosening the boots from those portions of the stalks which are not acted on by the recited means.

In witness whereof I hereunto sign my name in presence of two subscribing witnesses.

GEORGE H. PALLADY.

Witnesses:
FERN YATES,
WEBB A. HERLOCKER.

Copies of this patent may be obtained for five cents each, by addressing the "Commissioner of Patents, Washington, D. C."